United States Patent
Takahashi et al.

(10) Patent No.: US 7,315,964 B2
(45) Date of Patent: Jan. 1, 2008

(54) DIGITAL SIGNAL MEASURING APPARATUS AND TRAFFIC OBSERVING METHOD

(75) Inventors: Nobuaki Takahashi, Tokyo (JP); Takeo Nakada, Kawaguchi (JP); Nobuyuki Ohba, Sendai (JP)

(73) Assignee: International Business Machines Corporation, Armonk, NY (US)

( * ) Notice: Subject to any disclaimer, the term of this patent is extended or adjusted under 35 U.S.C. 154(b) by 1002 days.

(21) Appl. No.: 10/248,317

(22) Filed: Jan. 8, 2003

(65) Prior Publication Data

US 2003/0131288 A1 Jul. 10, 2003

(30) Foreign Application Priority Data

Jan. 8, 2002 (JP) .............................. 2002-001328

(51) Int. Cl.
*G06F 11/00* (2006.01)

(52) U.S. Cl. .......................................... 714/39; 714/43

(58) Field of Classification Search .................. 714/39, 714/43, 45
See application file for complete search history.

(56) References Cited

U.S. PATENT DOCUMENTS

| | | | | |
|---|---|---|---|---|
| 4,752,928 A | * | 6/1988 | Chapman et al. | 714/39 |
| 4,835,675 A | * | 5/1989 | Kawai | 714/45 |
| 5,426,741 A | * | 6/1995 | Butts et al. | 710/18 |
| 5,880,671 A | * | 3/1999 | Ranson et al. | 340/146.2 |
| 6,018,803 A | * | 1/2000 | Kardach | 713/323 |
| 6,018,809 A | * | 1/2000 | Garrett | 714/37 |
| 6,092,224 A | * | 7/2000 | LeBlanc et al. | 714/724 |
| 6,105,087 A | * | 8/2000 | Rivoir | 710/100 |
| 6,618,775 B1 | * | 9/2003 | Davis | 710/100 |
| 6,804,742 B1 | * | 10/2004 | Kitamura et al. | 710/312 |
| 7,020,801 B2 | * | 3/2006 | Dun et al. | 714/39 |
| 7,039,834 B1 | * | 5/2006 | Orfali | 714/39 |
| 2005/0010845 A1 | * | 1/2005 | Fenton et al. | 714/742 |

FOREIGN PATENT DOCUMENTS

| | | |
|---|---|---|
| JP | 05-196669 A1 | 8/1993 |
| JP | 7312594 | 11/1995 |
| JP | 11-344511 | 12/1999 |
| JP | PUPA 2001-289882 | 10/2001 |
| JP | 2001333138 | 11/2001 |

OTHER PUBLICATIONS

"HP E2910A PCI Bus Exerciser, Technical Data." Hewlett-Packard Company. 1996.*

* cited by examiner

*Primary Examiner*—Bryce P. Bonzo
*Assistant Examiner*—Philip Guyton
(74) *Attorney, Agent, or Firm*—Eustus D. Nelson

(57) ABSTRACT

A digital signal measuring apparatus comprises a bus probe unit for extracting a bus event occurring on a bus based on a digital bus signal on the bus of the system to be measured, a traffic measuring unit for counting the number of occurrences of bus event based on the occurrence information of the extracted bus event, and a console unit for acquiring and processing the count value of the traffic measuring unit.

16 Claims, 10 Drawing Sheets ations are prepared, interconnected externally, and synchronized, as shown in FIG. 8.
DIGITAL SIGNAL MEASURING APPARATUS AND TRAFFIC OBSERVING METHOD

BACKGROUND OF INVENTION

1. Field of the Invention

The present invention relates to a digital signal measuring apparatus and its observing method for observing the signal traffic on a bus of a system to be measured.

2. Background of the Invention

Conventionally, the observation and evaluation of a digital bus are generally performed in the following way.

While using a digital signal measuring apparatus such as a logic analyzer, a bus is probed and triggered with a predetermined bus pattern, then a digital bus signal is acquired, and the obtained data of digital bus signal is stored in a digital storage equipped for the logic analyzer. At the same time, the measurement result of this digital signal is displayed in waveform on a display.

In the case where the measurement result is observed and analyzed in detail, an analysis program is executed for the acquired data stored in the digital storage on a computer.

A conventional digital signal measuring apparatus for observing the digital bus is exemplified below.

FIG. 8 is a block diagram illustrating the configuration of the logic analyzer. In the same figure, two logic analyzers 810A and 810B are shown to observe two buses 820A and 820B, each logic analyzer having the same configuration.

Referring to FIG. 8, the logic analyzers 810A and 810B are connected to the probes 830 for acquiring a digital bus signal from the buses 820A and 820B, respectively, and comprise a trigger generating device 811 for timing the acquisition of the digital bus signal, a digital storage 812 for storing the data of acquired digital bus signal, and a display 813 for displaying the data.

The logic analyzers 810A and 810B observe the buses 820A and 820B, respectively, as shown in FIG. 8. The logic analyzers 810A and 810B are interconnected externally, in which the logic analyzer 810B is triggered upon a synchronizing signal from the logic analyzer 810A.

In Published Unexamined Japanese Patent Application No. 11-344511, a technique regarding a logic analyzer probe circuit that is interposed between the logic analyzer and a measured circuit measured by the logic analyzer was disclosed.

FIG. 9 is a block diagram showing the configuration of the logic analyzer probe circuit as described in the above patent.

Referring to FIG. 9, this logic analyzer probe circuit 910 comprises a probe circuit 911 for converting a signal input from a measurement point of a measured circuit 920 into electrical specification and outputting the converted signal, and a logic operation section (programmable gate array) 912 for inputting an output signal from the probe circuit 911, making a predetermined logical operation on the signal, and outputting a result of logical operation to a logic analyzer 930.

FIG. 10 is a block diagram showing the configuration of a PCI bus monitor as another conventional digital signal measuring apparatus.

In FIG. 10, if a bus monitor device 1010 is inserted into a PCI bus 1020 of a system to be measured, the bus monitor device 1010 acquires a digital bus signal passed on the PCI bus 1020, and stores the data of measurement result in a digital storage (SRAM) 1011 mounted in the bus monitor device 1010. After the end of measurement, the measurement result stored in the digital storage 1011 is transferred to a computer as an analyzer connected externally, and the computer executes a specific analysis program to produce the analysis result.

However, with a recent increase in the system bus width, the data amount that must be stored per unit time in measurement of the digital bus has become enormous.

From only the viewpoint of the data amount to be stored, an external storage (e.g., magnetic disk) may be additionally mounted outside the measuring apparatus, but when the system bus clock is fast; the data can not be written without delay because the external storage has a low write rate. Therefore, there is a need that the measuring apparatus mounts a digital storage (e.g., semiconductor memory) capable of writing fast internally.

The fast digital storage is expensive, and physically mountable with a limited capacity. Accordingly, in the present situation where the amount of data to be stored increases, the conventional digital signal measuring apparatus is difficult to perform the continuous observation and evaluation over the long time.

On one hand, for the evaluation and analysis of the total system, it is indispensable to make the observation over the long time. Also, it is indispensable to detect an unexpected bus event that must be observed over the long time to discover and evaluate its operation.

The conventional digital signal measuring apparatus acquired a digital bus signal on the bus, stored it in the digital storage, analyzed the stored digital bus signal to extract a bus event, and observed the signal traffic on the bus. Therefore, it was impossible to observe the signal traffic on the bus in real time in accordance with the operation of the system to be measured.

Further, in case of observing plural buses, due to the recent increase in the bus width, there are some instances where the number of buses to be measured exceeds the number of probes mountable on one logic analyzer. In this case, a plurality of logic analyzers are prepared, interconnected externally, and synchronized, as shown in FIG. 8.

However, the external connection through the cable is liable to produce more noise to cause the malfunction as the signal frequency is increased.

SUMMARY OF INVENTION

A feature of the preferred embodiments is to provide a digital signal measuring apparatus that can measure the signal traffic on a bus over the long time in a complex system having plural buses.

Another feature of the preferred embodiments is to detect and evaluate an unexpected bus event as issued rarely.

It is yet another feature of the preferred embodiments to observe the signal traffic on a bus in real time in accordance with an operation of the system to be measured.

Moreover, it is still another feature of the preferred embodiments to provide a digital signal measuring apparatus that can observe the signal traffic, even when plural buses are observed, without having a plurality of digital signal measuring apparatuses connected externally.

In order to accomplish the above features, this invention involves extracting a bus event from a digital bus signal on the bus of the system to be measured and processing the occurrence information of the bus event without directly storing or processing the digital bus signal. Thereby, the amount of information to be dealt with is reduced, and the observed result is displayed on the display at any time (in real time), or the continuous observation over the long time is enabled.

Various other objects, features, and attendant advantages of the present invention will become more fully appreciated as the same becomes better understood when considered in conjunction with the accompanying drawings, in which like reference characters designate the same or similar parts throughout the several views.

DETAILED DESCRIPTION

Figure 1:
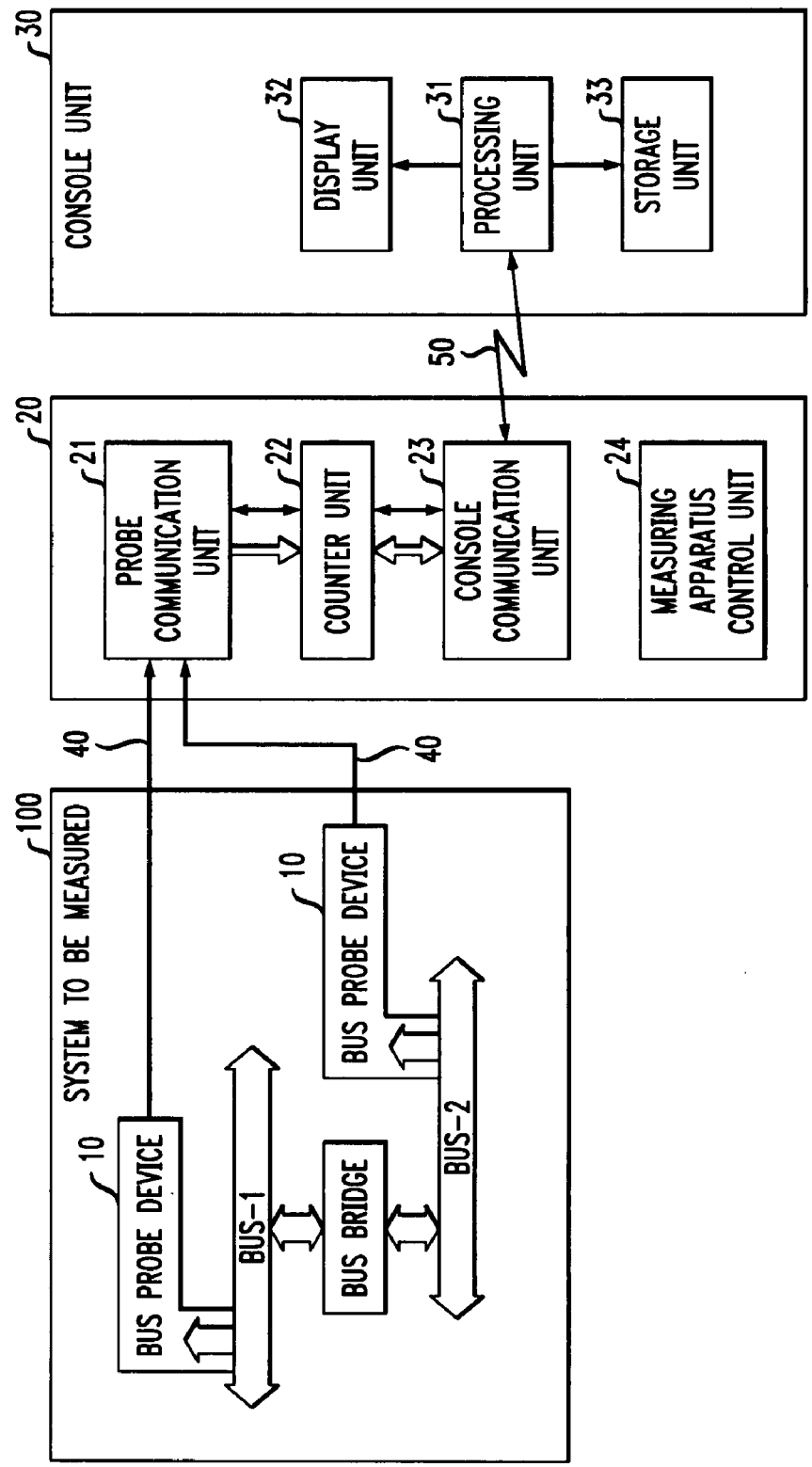
FIG. 1 is a block diagram showing the configuration of a digital signal measuring apparatus according to an embodiment of the present invention.

This invention provides a digital signal measuring apparatus comprising observing means for observing a bus event occurring on a bus of a system to be measured, storage means for storing the information regarding the occurrence of the bus event observed by the observing means, and processing means for processing the information regarding the occurrence of the bus event stored by the storage means.

Herein, the observing means comprises a probe for acquiring a digital bus signal on the bus, and a decoder for decoding the digital bus signal acquired by the probe into a bus event an object to be observed. Preferably, the decoder is realized by PLD (Programmable Logic Device).

Also, the storage means comprises a counter for counting the number of occurrences of bus event extracted by the observing means for each type of bus event, and a control section for reading a count value of the counter in response to a request from the processing means and sending the count value to the processing means.

Herein, a plurality of observing means may be provided corresponding to the number of buses in the system to be measured, in which the counter of the storage means counts the number of occurrences of bus event extracted by each of the plurality of observing means, and the processing means analyzes the correlation of plural buses based on the number of occurrences of bus event on the plural buses counted by the storage means.

The processing means may comprise a data processing section for analyzing the information regarding the occurrence of bus event acquired from the storage means, and a display section for visually displaying the result analyzed by the data processing section.

Also, the invention provides a digital signal measuring apparatus comprising a probe unit for acquiring a digital bus signal on a bus of a system to be measured, a decoder unit for extracting a bus event from the digital bus signal acquired by the probe unit, and a counter unit for counting the number of occurrences of bus event extracted by the decoder unit.

Moreover, the invention provides a digital signal measuring apparatus comprising observing means for acquiring a digital bus signal on a bus of a system to be measured and observing the occurrence of a bus event based on the digital bus signal, and information processing means for processing the information regarding an occurrence situation of the bus event observed by the observing means and displaying the processed information as the image at any time.

Herein, the information processing means may analyze the occurrence situation of bus event acquired from plural buses in the system to be measured and the correlation of the plural buses, and displays the analyzed result as the image at any time.

Moreover, this digital signal measuring apparatus may further comprise storage means for storing the information regarding the occurrence situation of bus event observed by the observing means.

Also, this invention provides a traffic observing method for observing the signal traffic on a bus of a system to be measured, comprising a step of acquiring a digital bus signal on the bus, a step of generating a trigger signal indicating an occurrence of the bus when the acquired digital bus signal is matched with a preset signal pattern defining a bus event, a step of counting the number of occurrences of bus event based on the generated trigger signal, and a step of analyzing the signal traffic on the bus based on the result of counting the number of occurrences of bus event.

More preferably, this traffic observing method may further comprise a step of generating the image data visualizing the analysis result of the signal traffic and displaying it at any time.

Herein, the step of analyzing the signal traffic further comprises a step of analyzing the count result of bus events acquired from plural buses and generating the information indicating the correlation of the plural buses.

Also, the step of counting the number of occurrences of bus event may comprise a step of receiving the trigger signal and counting it with a counter provided corresponding to the trigger signal, and a step of successively reading the count values of all the counters at predetermined timings and storing them in a buffer, and the step of analyzing the signal traffic may comprise a step of analyzing the signal traffic on the bus using the count values within the buffer after storing the count values of all the counters in the buffer.

The preferred embodiments of the present invention will be described below in detail with reference to the accompanying drawings.

FIG. 1 is a block diagram showing the configuration of a digital signal measuring apparatus according to an embodiment of the invention.

Referring to FIG. 1, the digital signal measuring apparatus of this embodiment comprises a bus probe device 10, a traffic measuring apparatus 20, and a console unit 30. A trigger data communications line 40 connecting the bus probe device 10 and a traffic measuring apparatus 20, and a measured data communications line 50 connecting the traffic measuring apparatus 20 and the console unit 30 are through the fast parallel transfer or serial transfer, using the USB, IEEE1394 or IEEE1284.

The bus probe device 10 is connected to a bus provided in a system to be measured 100, and functions as a measuring apparatus of a bus event occurring on the bus. That is, the bus probe device 10 acquires a digital bus signal on the bus, extracts a bus event from the digital bus signal, generates a signal indicating an occurrence of the bus event, and sends it to the traffic measuring apparatus 20. Also, the bus probe device 10 always observes a bus clock and transmits it to the traffic measuring apparatus 20 to hold a time series of counter trigger signals.

Figure 2:
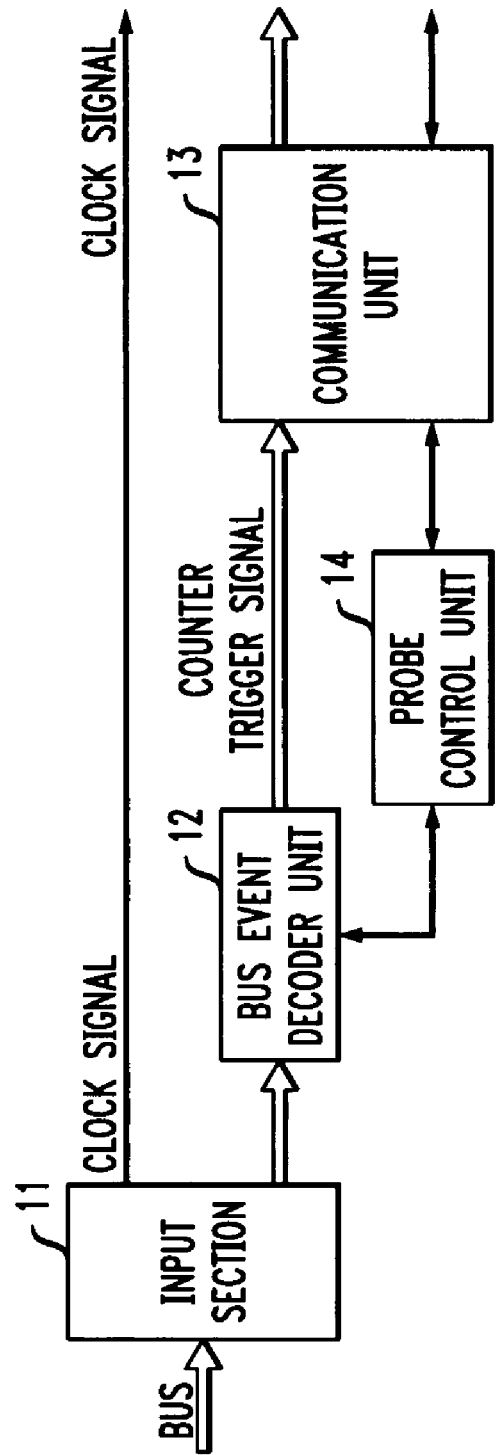
FIG. 2 is a block diagram showing the configuration of a bus probe device in this embodiment.

FIG. 2 is a block diagram showing the configuration of the bus probe device 10.

Referring to FIG. 2, the bus probe device 10 of this embodiment comprises an input section 11 for latching a digital bus signal from the bus of the system to be measured 100, a bus event decoder unit 12 for decoding the digital bus signal latched by the input section 11 into a bus event, a communication unit 13 for sending the occurrence information of bus event decoded by the bus event decoder unit 12 to the traffic measuring apparatus 20, and a probe control unit 14 for controlling the bus event decoder unit 12 and the communication unit 13.

The input section 11 is a probe unit connected to the bus of the system to be measured 100, and is identical to the probe usually employed to latch the digital bus signal. This probe is made of a high impedance material to suppress the influence on the system to be measured 100 as much as possible.

The bus event decoder unit 12 is realized by a PLD, for example, to extract a bus event as observing object from the digital bus signal latched by the input section 11. Namely, using table collation means, it is determined whether or not an observation event has occurred, based on the digital bus signal acquired by the input section 11. If the digital bus signal acquired by the input section 11 is matched with a preset signal pattern defining a bus event, a counter trigger signal indicating that the bus event has occurred is output. This counter trigger signal is output for each bus event. Accordingly, if the bus event decoder unit 12 is set to observe n kinds of bus event, n counter trigger signals are output. The counter trigger signal is sent from the communication unit 13 via the trigger data communications line 40 to the traffic measuring apparatus 20 for each bus event.

A plurality of bus probe devices 10 may be provided to extract the bus events on plural buses in the system to be measured 100, as shown in FIG. 1. In this case, each bus probe device 10, which has the same constitution, generates a counter trigger signal, based on a bus event occurring on each bus, and sends it with the bus clock via the trigger data communications line 40 to the traffic measuring apparatus 20.

In the above manner, in this embodiment, the bus probe device 10 not only acquires the digital bus signal, but also decodes the digital bus signal into a bus event and sends the bus event to the traffic measuring apparatus 20. Accordingly, there is no step of transmitting the digital bus signal via the outside cable, whereby it is possible to suppress the occurrence of noise as much as possible. Since the digital bus signal is not directly sent to the traffic measuring apparatus 20, but converted into the occurrence information of bus event and sent to the traffic measuring apparatus 20, a signal (counter trigger signal) notifying that a predetermined bus event has occurred is sent, upon occurrence of predetermined bus event, leading to great reduction in the information amount to be processed in the traffic measuring apparatus 20.

The traffic measuring apparatus 20 stores the information regarding the occurrence of bus event observed in the bus probe device 10. Specifically, the number of occurrences of bus event is counted based on the counter trigger signal sent from the bus probe device 10. And the count result (measured data) is sent back to the console unit 30, upon a request from the console unit 30.

Referring to FIG. 1, the traffic measuring apparatus 20 comprises a probe communication unit 21 for communicating with the bus probe device 10, a counter unit 22 for counting the number of occurrences of bus event, a console communication unit 23 for communicating with the console unit 30, and a measuring apparatus control unit 24 for controlling the overall operation of the traffic measuring apparatus 20.

The probe communication unit 21 receives a counter trigger signal sent from the communication unit 13 of the bus probe device 10, and outputs it to the counter unit 22. This probe communication unit 21 serves as a buffer for synchronizing the counter trigger signal with the counter unit 22. Also, the probe communication unit 21 can accept an input of counter trigger signal from the plurality of bus probe devices 10.

The counter unit 22 inputs a counter trigger signal from the probe communication unit 21, and updates the counter value corresponding to the input counter trigger signal. Thereby, the number of occurrences of bus event indicated by the counter trigger signal is counted.

Figure 3:
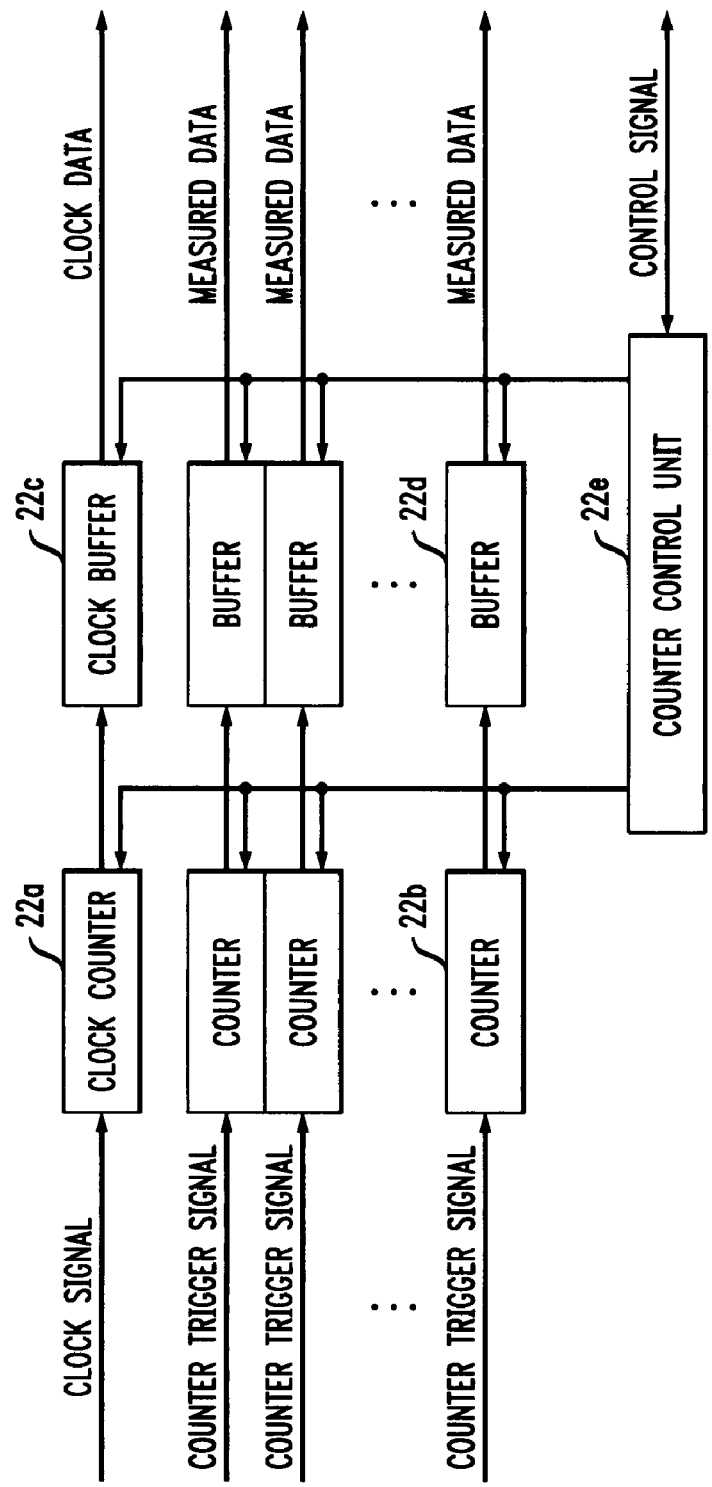
FIG. 3 is a diagram showing the configuration of a counter unit in this embodiment.

FIG. 3 is block diagram showing the configuration of the counter unit 22.

Referring to FIG. 3, the counter unit 22 comprises a clock counter 22a for receiving and counting a clock signal (bus clock) sent from the bus probe device 10, a counter 22b for receiving and counting the counter trigger signal, a clock buffer 22c for temporarily storing the count value of the clock counter 22a and the buffer 22d for temporarily storing the count value of the counter 22b, and a counter control unit 22e for controlling the counters and buffers (hereinafter abbreviated as counters 22a, 22b and buffers 22c, 22d, unless it is specifically necessary to distinguish between the clock counter 22a and the counter 22b, and the clock buffer 22c and the buffer 22d).

The counter 22b and the buffer 22d are provided corresponding to the number of counter trigger signals sent from the bus probe device 10, or the number of bus events observed in the bus probe device 10, as shown in FIG. 3. Thereby, the number of occurrences is counted for each bus event observed in the bus probe device 10.

The counter control unit 22e copies the count values of the clock counter 22a and the counters 22b to the clock buffer 22c and the corresponding buffers 22d in accordance with a control signal from the measuring apparatus control unit 24. After the count values of the clock counter 22a and all the counters 22b are read, the count values held in the clock buffer 22c and the buffers 22d are output to the console communication unit 23.

A counter trigger signal from the plurality of bus probe devices 10 may be input into the counter unit 22 via the probe communication unit 21. In this case, a set of counters 22a, 22b and buffers 22c, 22d as shown in FIG. 3 is provided for each bus. In the counter unit 22, it is unnecessary to specifically distinguish between the buses, but the corresponding counters 22a, 22b may count up for each signal.

In this embodiment, it is possible to cope with the increased number of buses as measuring object by adding the counters 22a, 22b and the buffers 22c, 22d in the counter unit 22. Thus, the measuring unit is readily extensible, without need of connecting externally a plurality of digital signal measuring apparatuses as in the conventional logic analyzer. Thereby, it is possible to suppress the occurrence of noise causing the malfunction.

The console communication unit 23 accepts a request from the console unit 30, and sends the measured data (count value) received from the clock buffer 22c and the buffers 22d of the counter unit 22 via the measured data communications line 50 back to the console unit 30.

The measuring apparatus control unit 24 controls the overall operation of the traffic measuring apparatus 20, but specifically controls the operation of sending back the measured data in the counter unit 22 and the consol communication unit 23. Namely, if the console communication unit 23, upon accepting a read request of measured data from the console unit 30, sends a control signal to the counter control unit 22e of the counter unit 22, which then copies the count values of the clock counter 22a and the counters 22b to the clock buffer 22c and the buffers 22d, and outputs them to the console communication unit 23. And the console communication unit 23 sends the measured data (count values) to the console unit 30.

The console unit 30 is realized on a computer such as a personal computer or a workstation, and comprises a processing unit (CPU) 31 for processing the measured data received from the traffic measuring apparatus 20, a display unit 32 for displaying the processed result by the processing unit 31, and a storage unit (digital storage) 33 such as a magnetic disk for storing the processed result by the processing unit 31.

The processing unit 31 executes an analysis program for analyzing the bus event in the system to be measured 100. Thereby, the processing unit 31 sends a read request of measured data (count value of the counter unit 22) indicating an occurrence situation of bus event to the traffic measuring apparatus 20 at a predetermined timing. Furthermore, the processing unit 31 analyzes the measured data sent back upon the read request, and stores the analysis result in the storage unit 33, as well as creating the image data visualizing the analysis result and displaying it on the display unit 32.

At a stage where the traffic measuring apparatus 20 counts the number of occurrences of bus event, the information regarding the signal traffic, such as when the bus event occurred, or how frequently the bus event occurs, can not be obtained. Accordingly, in this embodiment, the console unit 30 acquires the measured data (count value) from the traffic measuring apparatus 20 periodically or at any timing, thereby obtaining the information regarding the signal traffic in the bus, along with the time information at which the measured data is acquired. Namely, if the number of occurrences of each bus event indicated by the measured data is compared with the time (acquisition time) of acquiring the measured data, it is possible to recognize which bus event has occurred how many times in a period from one acquisition time to another acquisition time.

In this embodiment as described above, in the bus probe device 10 and the traffic measuring apparatus 20, a digital bus signal on the bus of the system to be measured 100 is decoded into a bus event, and the occurrence information of the bus event is only sent to the console unit 30. Accordingly, the console unit 30 does not need to store and process the digital bus signal, and can directly analyze the occurrence information of the acquired bus event. Therefore, the console unit 30 in this embodiment can display the analysis result at any time (in real time) on the display unit.

Moreover, the information to be handled is not the digital bus signal itself, but the occurrence information of bus event, whereby the amount of information to be processed can be greatly reduced. Therefore, the information obtained over longer time can be stored in the storage unit 33, as compared with the conventional logic analyzer. Accordingly, it is possible to observe the signal traffic on the bus in the system to be measured 100 over long time and in continuous basis. Thereby, the bus event occurring rarely can be observed and detected.

Also, the processing unit 31 analyzes the occurrence situation of bus event on plural buses, and generates the information indicating the correlation of signal traffic on those buses. For the correlation, a process of creating the image data visualizing the correlation information and displaying the image data on the display unit 32 can be performed in real time.

The above configuration is only illustrative of one preferred embodiment of the invention, and a difference in the constitution regarded as a simple design change may be included within a technical scope of the invention.

For example, in the above configuration, the buffers 22c, 22d for temporarily storing the count values read from the counters 22a, 22b of the counter unit 22 are provided in the counter unit 22 itself, but may be provided separately from the counter unit 22, or in the console communication unit 23.

The input section 11 in the bus probe device 10 and the bus event decoder unit 12 do not need to be configured integrally. With a view to reducing the information amount of processing object by decoding the digital bus signal into the bus event and processing or storing the bus event, rather than directly processing or storing the digital bus signal, the bus event decoder unit 12 may be interposed between the probe corresponding to the input section 11 and the traffic measuring apparatus 20 of this embodiment, or the probe and the bus event decoder unit 12 may be connected via the external cable.

In the embodiment with the above configuration, an operation of observing the event occurring on the bus and measuring the signal traffic on the bus will be described below.

The bus events occurring on the bus are denoted as event—1, 2, 3 (hereinafter abbreviated as E-1, E-2 and E-3). The bus event decoder unit 12 of the bus probe device 10 sends a counter trigger signal corresponding to each bus event (hereinafter denoted as T-1, T-2 and T-3 for corresponding bus event) to the traffic measuring apparatus 20, when observing each bus event E-1, E-2 and E-3. If the counter unit 22 of the traffic measuring apparatus 20 receives the counter trigger signal T-1, T-2 and T-3, it increments the count value of corresponding counter 22b (hereinafter denoted as C-1, C-2 and C-3 corresponding to the counter trigger signal).

Figure 4:
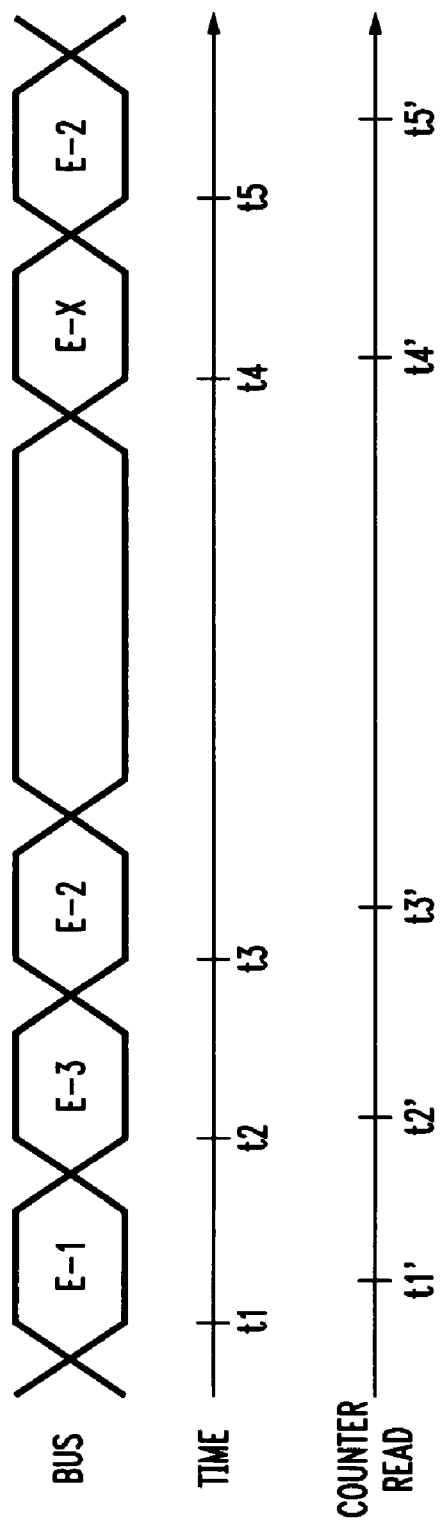
FIG. 4 is a chart for explaining the relation between the occurrence situation of bus event and the read timing of the count value of counter in the counter unit.

FIG. 4 is a chart for explaining the relation between the occurrence situation of bus event and the read timing of count value of the counter 22b in the counter unit 22.

The bus probe device 10 always observes the bus clock in the system to be measured 100 and sends it to the traffic measuring apparatus 20. Also, the clock counter 22a of the counter unit 22 receives the clock signal from the bus probe device 10 and counts up the number of clocks (hereinafter this number of clocks is denoted as CLK).

If E-1 is detected by the bus event decoder unit 12 of the bus probe device 10 at time $t_1$, T-1 corresponding to E-1 is sent from the bus probe device 10 to the traffic measuring apparatus 20, and corresponding C-1 is counted up in the counter unit 22.

Then, if a read request of the measured data is issued from the console unit 30 to the traffic measuring apparatus 20 at time $t_1'$, CLK, C-1, C-2 and C-3 of each counter 22a, 22b are copied onto the corresponding buffer 22c, 22d in the counter unit 22. And the value of the buffer 22c, 22d is locked till the CLK, C-1, C-2 and C-3 are read from the buffer 22c, 22d, and sent to the console unit 30. Upon a read request from the console unit 30, CLK, C-1, C-2 and C-3 are read from the buffer 22c, 22d, and the buffer 22c, 22d is unlocked.

Then, if E-3 is detected by the bus event decoder unit 12 of the bus probe device 10 at time $t_2$, T-3 corresponding to E-3 is sent from the bus probe device 10 to the traffic measuring apparatus 20, and the corresponding C-3 is counted up in the counter unit 22.

Then, if a read request of the measured data is issued from the console unit 30 to the traffic measuring apparatus 20 at time $t_2'$, CLK, C-1, C-2 and C-3 of each counter 22a, 22b are copied onto the corresponding buffer 22c, 22d in the counter unit 22. And the value of the buffer 22c, 22d is locked till the CLK, C-1, C-2 and C-3 are read from the buffer 22c, 22d, and sent to the console unit 30. Upon a read request from the console unit 30, CLK, C-1, C-2 and C-3 are read from the buffer 22c, 22d, and the buffer 22c, 22d is unlocked.

In the console unit 30, evaluating a difference between the count values indicating the number of occurrences of measured data bus events acquired at time $t_1'$ and time $t_2'$, CLK indicates the number of clocks from $t_1'$ to $t_2'$, C-3 is incremented by one, and other counters are unchanged. From this analysis result, it can be recognized that one bus event was issued in the bus from $t_1'$ to $t_2'$. The actual time interval from time $t_1'$ to time $t_2'$ is equal to $(t_2-t_1)$/clock frequency.

A specific example of the system to be measured 100 as the computer in this embodiment will be described below.

Figure 5:
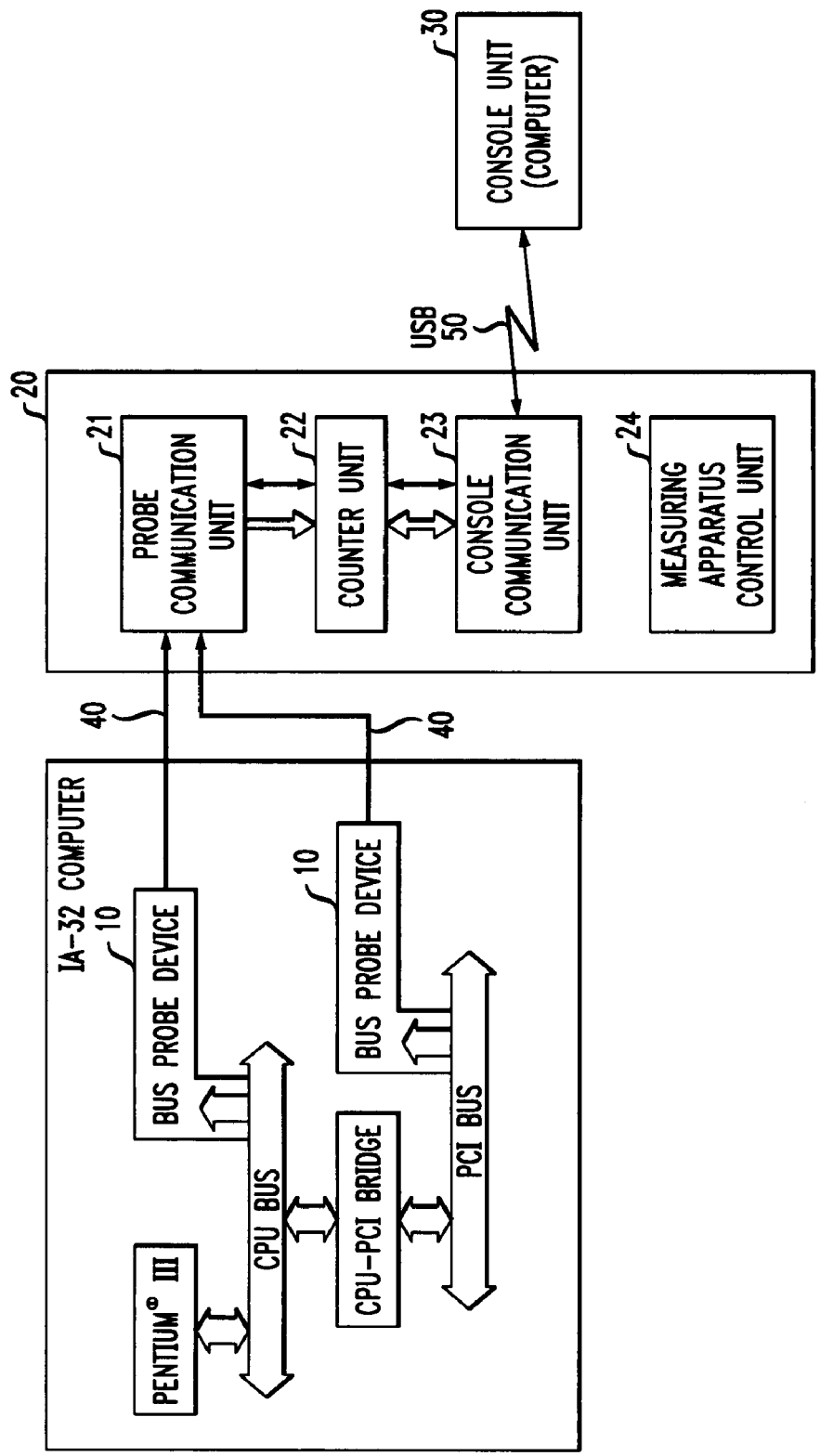
FIG. 5 is a block diagram showing the configuration for observing the signal traffic through the CPU bus and the PCI bus in this embodiment, in which the system to be measured is a computer system of IA-32.
Figure 6:
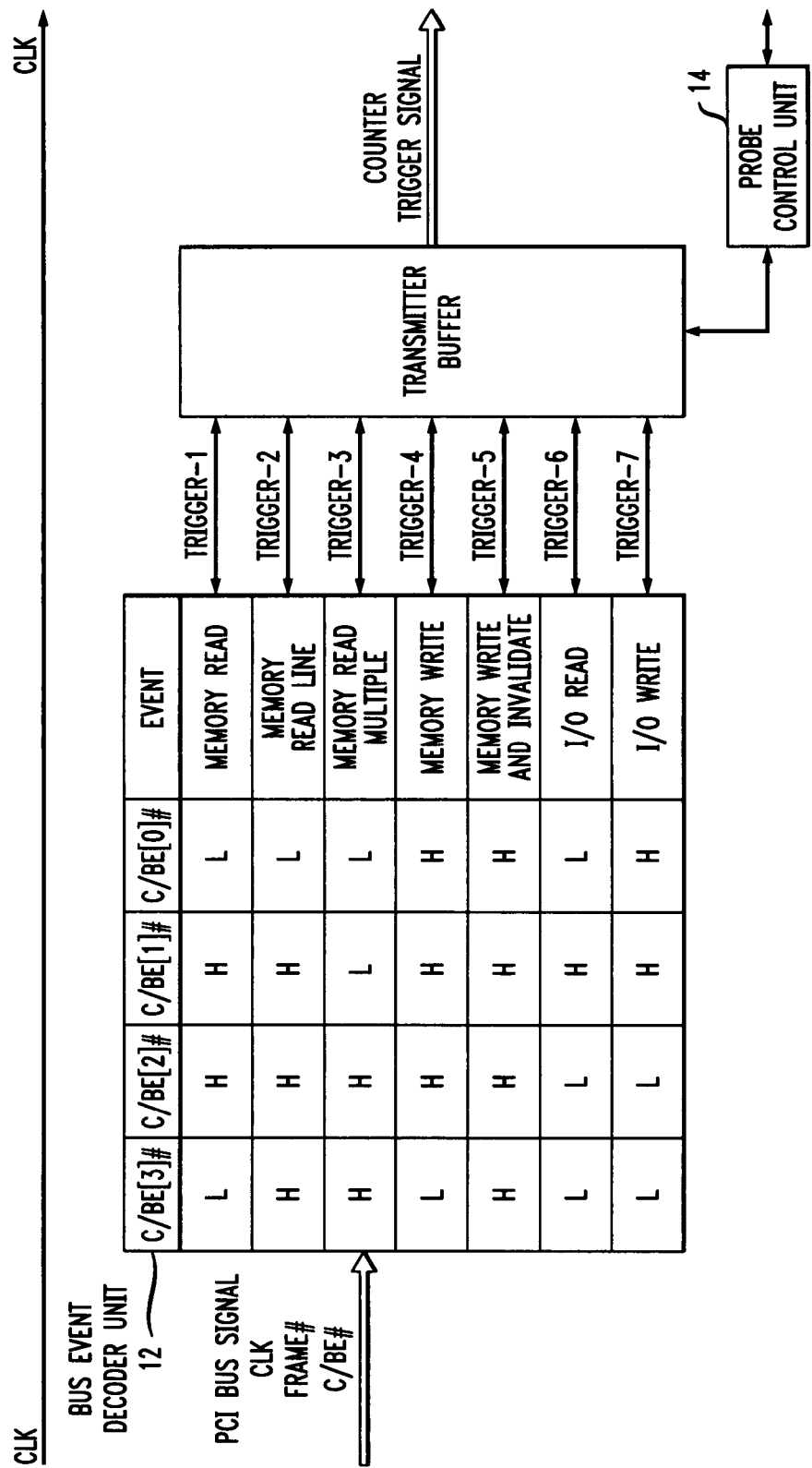
FIG. 6 is a diagram for explaining the operation of a bus event decoder unit in accordance with an occurrence situation of bus event through the PCI bus in FIG. 5.
Figure 7:
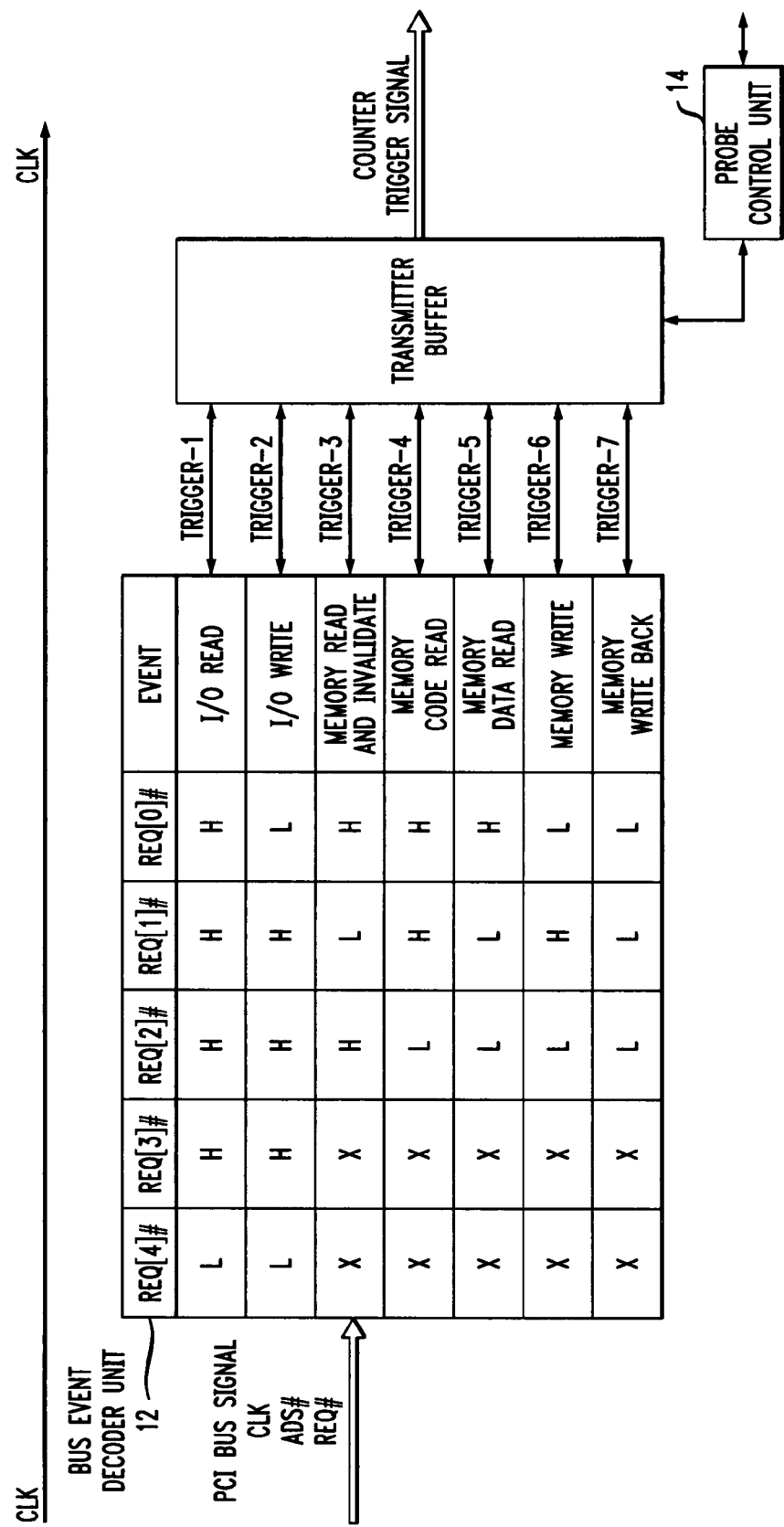
FIG. 7 is a diagram for explaining the operation of a bus event decoder unit in accordance with an occurrence situation of bus event through the CPU bus in FIG. 5.
Figure 8:
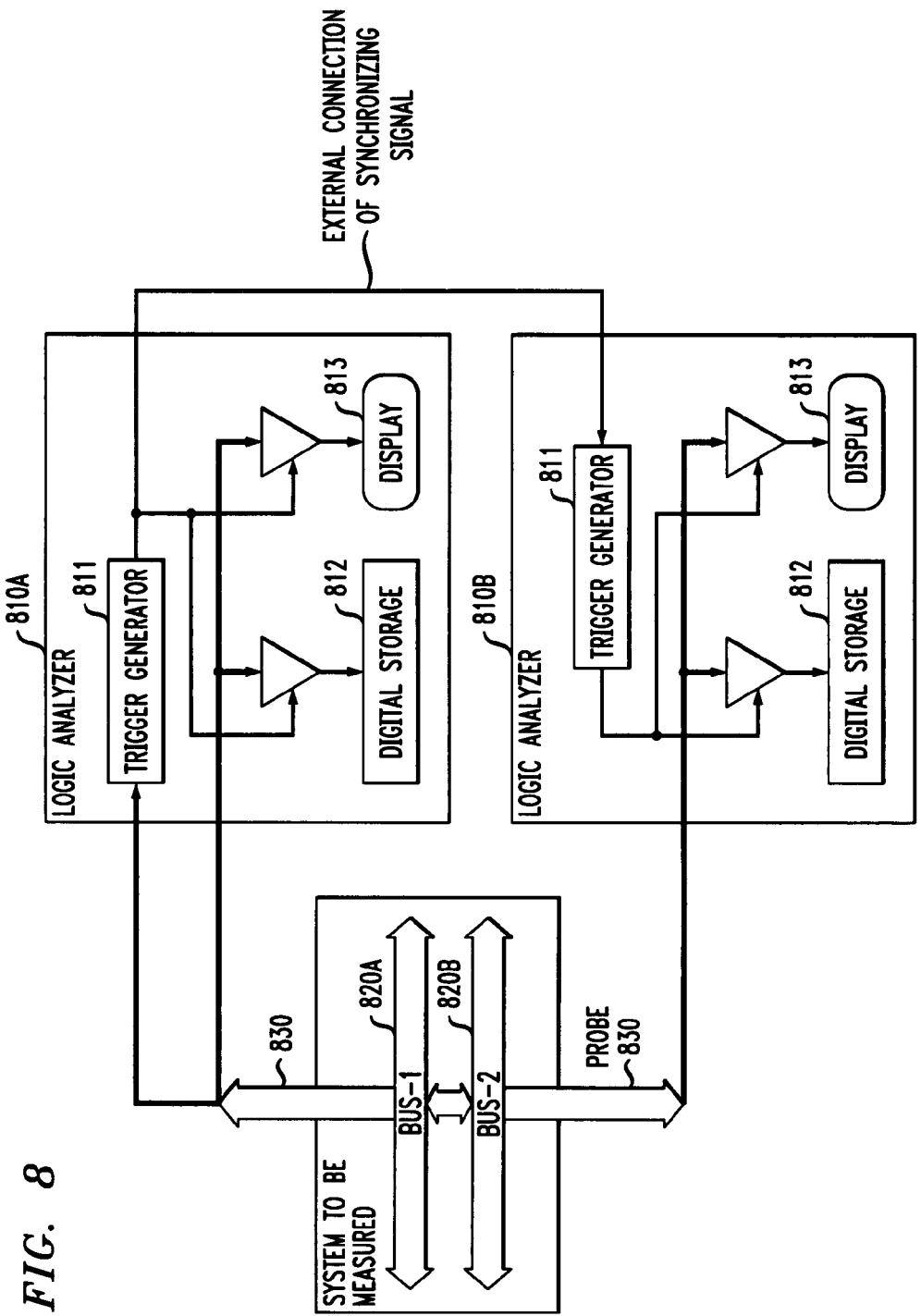
FIG. 8 is a block diagram illustrating the configuration of a conventional logic analyzer.
Figure 9:
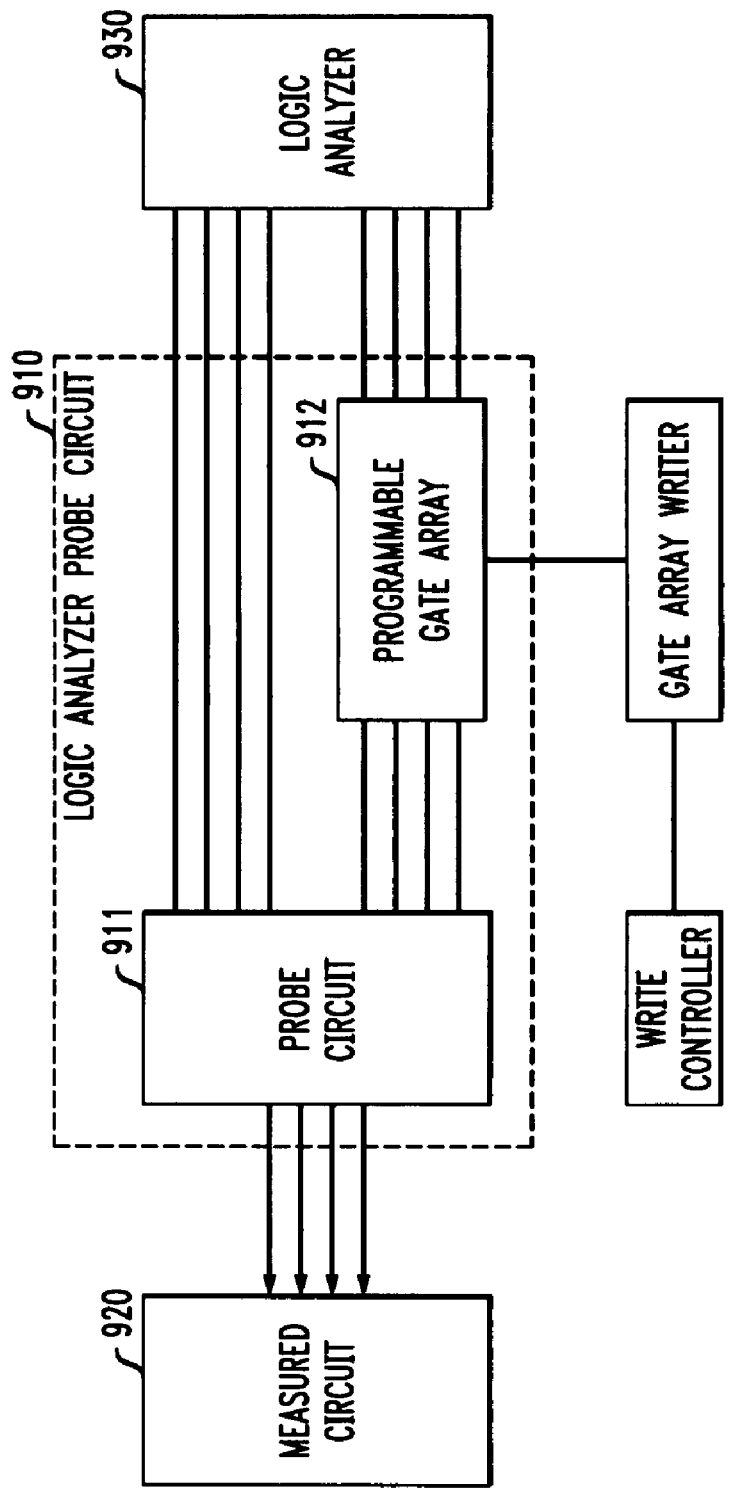
FIG. 9 is a block diagram illustrating the configuration of a conventional logic analyzer probe circuit.
Figure 10:
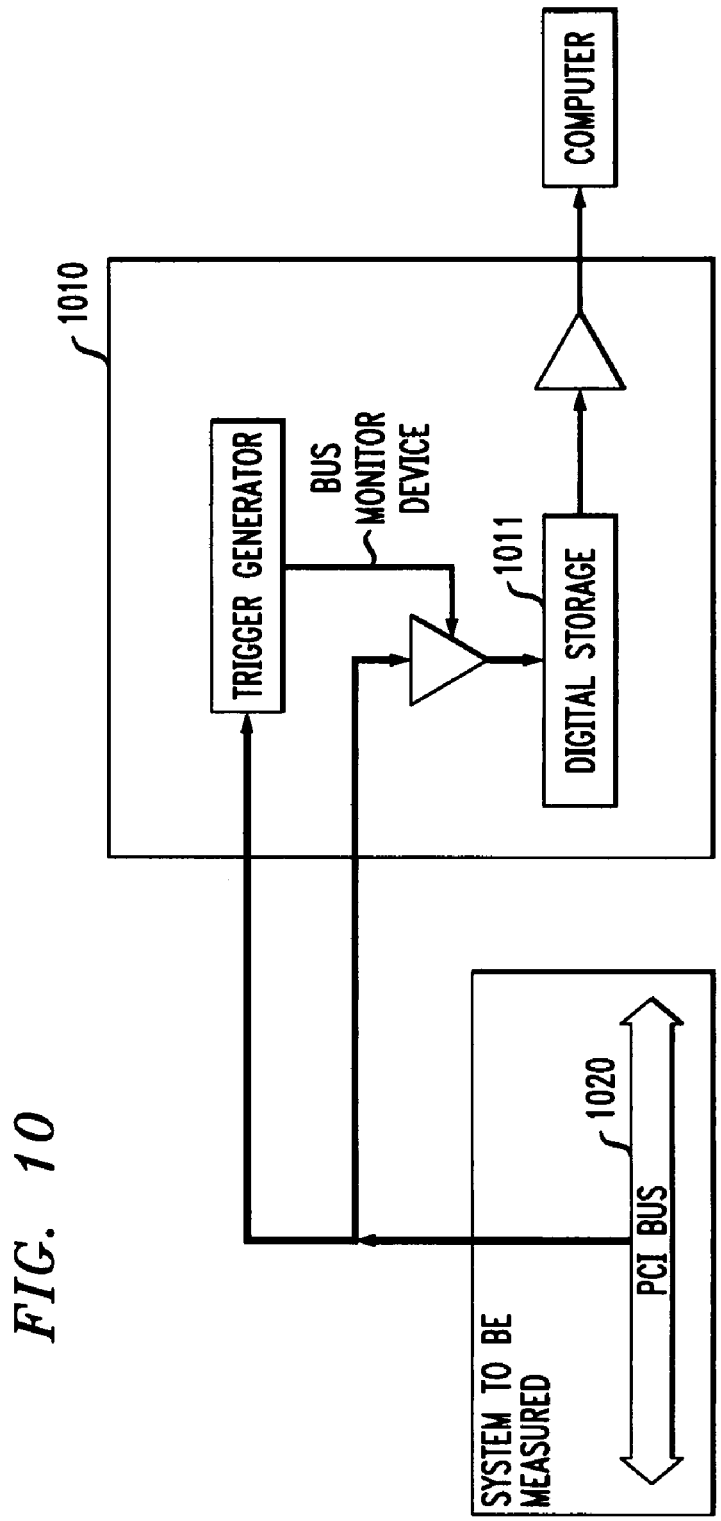
FIG. 10 is a block diagram illustrating the configuration of a PCI bus monitor as another conventional digital signal measuring apparatus.

FIG. 5 is a block diagram showing the configuration for observing the signal traffic on the CPU bus and PCI bus in this embodiment, in which the system to be measured 100 is the computer system of IA-32. FIG. 6 is a diagram for explaining the operation of a bus event decoder unit 12 in accordance with an occurrence situation of bus event through the PCI bus in FIG. 5. FIG. 7 is a diagram for explaining the operation of the bus event decoder unit 12 in accordance with an occurrence situation of bus event through the CPU bus in FIG. 5.

The computer system as the system to be measured 100 mounts a Pentium® III processor of Intel Inc., in the United States as the CPU, and comprises the CPU bus and the PCI bus connected via a CPU-PCI bridge to the CPU bus, as shown in FIG. 5. The bus probe device 10 is connected to each of the CPU bus and the PCI bus to observe a digital bus signal on each of the CPU bus and the PCI bus. And in the bus event decoder unit 12 of the bus probe device 10, a bus event occurring on each of the CPU bus and the PCI bus is extracted, and a counter trigger signal is sent to the traffic measuring apparatus 20.

The traffic measuring apparatus 20 accepts the counter trigger signal, and counts the number of occurrences of bus event in the counter unit 22. And this count value is sent to the console unit 30 and processed.

In the configuration as shown in FIG. 5, the traffic measuring apparatus 20 and the console unit 30 are USB connected, and the USB cable is employed as the measured data communications line 50.

Referring to FIG. 6, three kinds of signals, bus clock (CLK), FRAME# and C/BE#, as the PCI bus signal are input into the bus event decoder unit 12. Four C/BE# signals from C/BE[0]# to C/BE [3]# are input, and seven kinds of events (Memory Read, Memory Read Line, Memory Read Multiple, Memory Write, Memory Write and Invalidate, I/O Read, I/O Write) are detected in accordance with the values of four C/BE# signals. And a counter trigger signal (Trigger-1 to Trigger-7) is output for each event.

Referring to FIG. 7, three kinds of signals, bus clock (CLK), ADS# and REQ#, as the CPU bus signal are input into the bus event decoder unit 12. Five REQ# signals from REQ[0]# to REQ[4]# are input, and seven kinds of events (I/O Read, I/O Write, Memory Read and Invalidate, Memory Code Read, Memory Data Read, Memory Write, Memory Write Back) are detected in accordance with the values of five REQ# signals. And a counter trigger signal (Trigger-1 to Trigger-7) is output for each event.

As described above, with this invention, it is possible to measure the signal traffic on the bus over the long time in a complex system having plural buses by reducing the amount of information to be dealt with in the digital signal measuring apparatus.

Thereby, it is possible to detect and evaluate an unexpected bus event as issued rarely.

Also, it is possible to observe the signal traffic on the bus in real time in accordance with an operation of the system to be measured by decoding a digital bus signal on the bus into a bus event.

Moreover, it is possible to provide an apparatus constitution that can observe the signal traffic, even when plural buses are observed, without having a plurality of digital signal measuring apparatuses connected externally.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

The invention claimed is:

1. A digital signal measuring apparatus comprising:
   at least one bus probe operative to acquire at least one signal from at least one bus, decode the at least one signal to determine whether at least one of a plurality of events has occurred, and output at least one trigger signal indicative of whether the at least one of the plurality of events has occurred; and
   at least one counter unit coupled to the at least one bus probe and comprising at least one counter, the at least one counter operative to store at least one value based at least in part on at least a given trigger signal;
   wherein the at least one bus probe is further operative to acquire at least one clock from the at least one bus and wherein the counter unit further comprises a clock counter operative to store a value based at least in part on the at least one clock.

2. The digital signal measuring apparatus of claim 1, wherein each bus probe outputs a plurality of trigger signals and each trigger signal indicates whether a respective one of the plurality of events has occurred.

3. The digital signal measuring apparatus of claim 1, wherein a given one of a plurality of bus probes acquires at least one signal from a given one of a plurality of buses.

4. The digital signal measuring apparatus of claim 1, further comprising a buffer for synchronizing the at least one trigger signal with the at least one counter.

5. The digital signal measuring apparatus of claim 1, further comprising at least one processing unit operative to read at least one value from the at least one counter.

6. The digital signal measuring apparatus of claim 1, wherein the plurality of events comprise at least one of a memory read and a memory write.

7. The digital signal measuring apparatus of claim 1, wherein the plurality of events comprise at least one of a memory read line, a memory read multiple, and a memory write and invalidate.

8. The digital signal measuring apparatus of claim 1, wherein the plurality of events comprise at least one of an input/output read and an input/output write.

9. A digital signal measuring apparatus comprising:
   at least one bus probe operative to acquire at least one signal from at least one bus, decode the at least one signal to determine whether at least one of a plurality of events has occurred, and output at least one trigger signal indicative of whether the at least one of the plurality of events has occurred;
   at least one counter unit coupled to the at least one bus probe and comprising at least one counter, the at least one counter operative to store at least one value based at least in part on at least a given trigger signal; and
   at least one processing unit operative to read at least one value from the at least one counter;
   wherein the at least one counter unit further comprises at least one buffer associated with the at least one counter and operative to copy the at least one value from the at least one counter and output the at least one value to the at least one processing unit.

10. A digital signal measuring apparatus comprising:
    at least one bus probe operative to acquire at least one signal from at least one bus, decode the at least one signal to determine whether at least one of a plurality of events has occurred, and output at least one trigger signal indicative of whether the at least one of the plurality of events has occurred; and
    at least one counter unit coupled to the at least one bus probe and comprising at least one counter, the at least one counter operative to store at least one value based at least in part on at least a given trigger signal;
    wherein at least a first bus probe is operative to acquire at least one signal from at least one processor bus and wherein at least a second bus probe is operative to acquire at least one signal from at least one peripheral bus.

11. The digital signal measuring apparatus of claim 10, wherein the at least one processor bus and the at least one peripheral bus are interconnected by at least one bus bridge.

12. A traffic observing method, comprising the steps of:
    acquiring at least one signal from at least one bus;
    decoding the at least one signal to determine whether at least one of a plurality of events has occurred;
    generating at least one trigger signal indicative of whether the at least one of the plurality of events has occurred;
    storing at least one value based at least in part on the at least one trigger signal;
    acquiring at least one clock from the at least one bus;
    storing at least one value based on the at least one clock;
    reading the at least one stored value; and
    performing analysis based at least in part on the at least one value;
    wherein the step of reading comprises:
       receiving at least one request for at least one stored value;
       copying the at least one requested stored value into at least one buffer, wherein the at least one value in the at least one buffer is maintained until the step of reading is complete;
       outputting the at least one value in the at least one buffer in response to the at least one request.

13. The traffic observing method of claim 12, wherein each trigger signal indicates whether a respective one of the plurality of events has occurred.

14. A traffic observing method, comprising the steps of:
    acquiring at least one signal from at least one bus;
    decoding the at least one signal to determine whether at least one of a plurality of events has occurred;
    generating at least one trigger signal indicative of whether the at least one of the plurality of events has occurred;
    storing at least one value based at least in part on the at least one trigger signal;
    acquiring at least one clock from the at least one bus;
    storing at least one value based on the at least one clock;
    reading the at least one stored value; and
    performing analysis based at least in part on the at least one value;
    wherein the step of performing analysis comprises calculating at least one difference between the at least one presently-read value based on the at least one signal and at least one previously-read value based on the at least one signal, the difference representing a number of occurrences of at least one event between the previous reading and the present reading.

15. The traffic observing method of claim 14, wherein the step of reading comprises reading at least one value based on the at least one clock and reading at least one value based on at least one signal and wherein the step of performing analysis comprises calculating at least one difference between the at least one presently-read value based on the at least one clock and a previously-read value based on the at least one clock, the difference representing a period of time between the previous reading and the present reading.

16. The traffic observing method of claim 15, wherein the step of performing analysis further comprises:
    calculating at least one difference between the at least one presently-read value based on the at least one signal and a previously-read value based on the at least one signal, the difference representing a number of occurrences of at least one event; and
    comparing the difference representing a number of occurrences of at least one event between the previous reading and the present reading with the difference representing a period of time between the previous reading and the present reading.

* * * * *